(12) United States Patent
Bell et al.

(10) Patent No.: US 9,400,013 B2
(45) Date of Patent: Jul. 26, 2016

(54) BEARING LINER

(71) Applicants: Andrew Bell, Clevedon (GB); Michael Colton, Bristol (GB); Camille Dayot, Valence (FR); Noemie Peron, Saint-Vallier sur Rhone (FR)

(72) Inventors: Andrew Bell, Clevedon (GB); Michael Colton, Bristol (GB); Camille Dayot, Valence (FR); Noemie Peron, Saint-Vallier sur Rhone (FR)

(73) Assignees: AKTIEBOLAGET SKF, Gothenburg (SE); SKF AEROSPACE FRANCE S.A.S., Saint-Vallier (FR)

( * ) Notice: Subject to any disclaimer, the term of this patent is extended or adjusted under 35 U.S.C. 154(b) by 0 days.

(21) Appl. No.: 14/737,575

(22) Filed: Jun. 12, 2015

(65) Prior Publication Data

US 2015/0362017 A1 Dec. 17, 2015

(30) Foreign Application Priority Data

Jun. 12, 2014 (GB) .................................. 1410486.3

(51) Int. Cl.
*F16C 33/20* (2006.01)
*F16C 33/10* (2006.01)
*F16C 33/16* (2006.01)

(52) U.S. Cl.
CPC ........... *F16C 33/201* (2013.01); *F16C 33/1095* (2013.01); *F16C 33/16* (2013.01); *F16C 33/20* (2013.01); *F16C 33/203* (2013.01); *F16C 33/208* (2013.01); *F16C 2208/02* (2013.01); *F16C 2208/04* (2013.01); *F16C 2208/32* (2013.01); *F16C 2208/36* (2013.01)

(58) Field of Classification Search
CPC ... F16C 33/201; F16C 33/208; F16C 2208/02
See application file for complete search history.

(56) References Cited

U.S. PATENT DOCUMENTS

| 4,137,618 | A | 2/1979 | Krauss |
| 7,226,213 | B2 * | 6/2007 | Roos ........................ F16C 33/04 384/298 |
| 8,021,051 | B2 * | 9/2011 | James ................ B60G 21/0551 384/276 |
| 2010/0262059 | A1 | 10/2010 | Doya |

FOREIGN PATENT DOCUMENTS

EP 1837534 A3 7/2008

* cited by examiner

*Primary Examiner* — Thomas R. Hannon
(74) *Attorney, Agent, or Firm* — Bryan Peckjian; SKF USA Inc. Patent Dept.

(57) ABSTRACT

A bearing liner comprising a fabric impregnated with a binder, the fabric comprising: (a) a bearing element contact surface comprising lubricating fibers and (b) structural fibers supporting the bearing element contact surface, wherein at least some of the structural fibers include a structural component and a lubricating component.

18 Claims, 4 Drawing Sheets

BEARING LINER

CROSS REFERENCE TO RELATED APPLICATIONS

This is a Non-Provisional Patent Application, filed under the Paris Convention, claims the benefit of Great Britain Patent (GB) Application Number 1410486.3 filed on 12 Jun. 2014, which is incorporated herein by reference in its entirety.

TECHNICAL FIELD

The present invention relates generally to the field of bearings, and in particular to an improved bearing liner and a bearing containing the same. The bearing liner has a low rate of wear in use, and may be used in a number of applications, for example aerospace applications.

BACKGROUND

Bearings are devices that permit constrained relative motion between two parts. A plain bearing is the simplest type of bearing, comprising just a bearing surface and no rolling elements. Therefore the journal (i.e. the part of the shaft in contact with the bearing) slides over the bearing surface. The simplest example of a plain bearing is a shaft rotating in a hole. Two-piece plain bearings, known as full bearings in industrial machinery, are commonly used for larger diameters, such as crankshaft bearings. Self-lubricating plain bearings have a lubricant contained within the bearing walls. The lubricant is typically an integral element of the bearing material and remains part of the bearing's makeup for its useful life without the need for outside maintenance.

Plain bearings often contain a liner between the bearing surfaces to reduce friction. Typical prior art fabric liners used in self-lubricating bearings comprise a woven fabric combined with a binder to form a composite material that can be affixed to bearing surfaces. The fabric component of the composite consists of a top surface of lubricating yarns (typically PTFE), which degrade through motion at the working surface, providing the bearing with lubricant, and structural yarns (typically glass fibers), which help retain the lubricating yarns and provide the composite with its structural integrity.

The present invention seeks to tackle at least some of the problems associated with the prior art or at least to provide a commercially acceptable alternative solution thereto.

BRIEF SUMMARY OF THE INVENTION

In a first aspect, the present invention provides a bearing liner comprising a fabric impregnated with a binder, the fabric comprising:
- a bearing element contact surface comprising lubricating fibers, and
- structural fibers supporting the bearing element contact surface,
- wherein at least some of the structural fibers comprise a structural component and a lubricating component.

Each aspect or embodiment as defined herein may be combined with any other aspect(s) or embodiment(s) unless clearly indicated to the contrary. In particular, any features indicated as being preferred or advantageous may be combined with any other feature indicated as being preferred or advantageous.

The term "bearing liner" as used herein encompasses a material for disposal between bearing elements to reduce friction therebetween.

The fabric is preferably a woven fabric. The term "woven fabric" as used herein encompasses a textile formed by weaving.

The term "bearing element contact surface" as used herein encompasses a surface of a bearing liner that, in use, is in sliding contact with a bearing element and/or journal.

The term "self-lubricating bearing" as used herein encompasses a bearing that does not require re-lubrication. In particular, it is preferred that a dry lubricant is an integral element of the bearing material.

The inventors have surprisingly found that the bearing liner of the present invention may exhibit a reduced rate of wear in the end of life phase compared to bearing liners of the prior art. As a result, the time between an alarm point and a critical point is increased. This is particularly advantageous when the bearing is used in aerospace applications, where an improved chance of identifying and replacing the worn part increases the safety of the aircraft. Accordingly, the inspection interval may increase, thereby resulting in reduced maintenance costs.

In use, the lubricating fibers degrade through motion at the working surface releasing lubricant material from the fibers to the bearing element contact surface (i.e. working surface). The lubricating fibers preferably have low wear characteristics and typically have a low coefficient of friction, preferably less than 0.2, more preferably from 0.01 to 0.1. The lubricating fibers typically have a diameter of from 0.1 mm to 0.2 mm, more typically from 0.12 to 0.13 mm. The lubricating fibers are typically wefts and/or warps. The lubricating fibers may be yarns. Preferably, the lubricating fibers are chemically and thermally stable in a bearing application.

The lubricating fibers preferably comprise PTFE (polytetrafluoroethylene), graphite or graphene. These materials have a low coefficient of friction, and may therefore reduce the friction between the bearing liner and the bearing element surface to which it is in sliding contact. Accordingly, a bearing incorporating the bearing liner will exhibit smoother, more efficient operation.

The structural fibers serve to maintain the structural integrity of the liner, thereby reducing the rate of degradation of the liner. The structural fibers provide mechanical strength to support the load in the bearing application. The structural fibers typically have a diameter of from 0.1 mm to 0.5 mm, more typically from 0.2 to 0.35 mm. The structural fibers are typically wefts and/or warps. The structural fibers may be yarns. Preferably, the structural fibers are chemically and thermally stable in a bearing application.

The structural fibers support the bearing element contact surface. It is not necessary for the structural fibers to be immediately beneath the contact surface and the two may be spaced apart.

At least some of the structural fibers comprise a structural component (i.e. a component that serves to support the structural fibers and, in turn, the bearing element contact surface) and a lubricating component (i.e. a low friction and/or low wear component). Typically, most of the structural fibers comprise a structural component and a lubricating component, more typically substantially all of the structural fibers comprise a structural component and a lubricating component.

Without being bound by theory, it is considered that the presence of the lubricating component of the structural fibers may serve to reduce wear during the end of life phase, i.e. when the liner is worn through the bearing element contact surface to the structural fibers. The combination of the structural component and the lubricating component may serve to provide a particularly advantageous combination of reducing the wear rate in the end of life phase, while maintaining the structural integrity of the bearing liner.

The structural fibers may be "hybrid" fibers, comprising a first material acting as the structural component and a second material acting as the lubricating component. Such "hybrid" fibers may comprise a blend of structural and lubricating components. In one embodiment, the structural fibers may be formed of a core of a first material acting as the structural component coated or sheathed with a second material acting as the lubricating component. Such fibers may be formed by co-extrusion. In an alternative embodiment, the structural fibers may comprise a core of a first material acting as the structural component, which is wrapped (e.g. coiled) in fibers of a second material acting as the lubricating component.

The structural component of the structural fibers preferably comprises one or more of glass, carbon fiber, aramid, polyether ether ketone (PEEK), polyester, polyamide and polyphenylene sulphide (PPS), more preferably aramid. These materials are particularly effective at maintaining the structural integrity of the liner. Accordingly, the lifetime of the bearing liner may increase. Suitable aramids may include, for example, meta-aramids (e.g. Nomex™—a polymer formed from the condensation reaction of the monomers m-phenylenediamine and isophthaloyl chloride) and para-aramids (e.g. Kevlar™).

The lubricating component of the structural fibers preferably comprises PTFE, graphite or graphene. These materials have a low coefficient of friction, and may therefore reduce the rate of wear of the bearing liner during the end of life phase.

In a particularly preferred embodiment, the structural component comprises aramid, and the lubricating component comprises PTFE. For example, aramid fibers or yarns may be wrapped with PTFE fibers or Yarns. In another example stretch broken aramid yarns may be sheathed with PTFE.

Such a bearing liner may exhibit particularly reduced wear rate in the end of life phase together with particularly high structural integrity.

In this embodiment, the structural component preferably comprises from 10 to 30 wt. % aramid; and from 70 to 90 wt. % PTFE.

The binder, which is impregnated in the fabric, may act as a matrix in which the various fibers are embedded. The binder preferably comprises resin, more preferably a phenolic resin. Preferably, the binder is chemically and thermally stable in a bearing application. The binder may optionally further comprise anti-wear, low friction components such as, for example, molybdenum disulphide.

The bearing liner is typically in the form of a sheet, cloth, strip or loop before it is introduced into the bearing, for example by bonding it to the bore of an outer ring.

The bearing liner may be laminated to a support layer, for example a support layer comprising glass fibers in a resin matrix/binder. This may allow the liner to be fixed more easily to a bearing element, for example to bore of an outer ring.

In a further aspect, the present invention provides a bearing comprising:
  an inner ring,
  an outer ring, and
  the bearing liner as described herein disposed therebetween.

The inner ring typically sits concentrically within the outer ring. The bearing liner may be fixed to the inner ring, with the bearing element contact surface in contact with the outer ring. Alternatively, the bearing liner may be fixed to the outer ring, with the bearing element contact surface in contact with the inner ring. The inner ring may have a convex outer surface and the outer ring may have a concave inner surface. Alternatively, the inner ring may have a concave outer surface and the outer ring may have a convex inner surface. The bearing is typically a plain bearing, more typically a two-piece plain bearing. One or both of the inner and outer rings will typically be formed of a bearing steel. An example of a steel for the inner ring is AMS 5630. An example of a steel for the outer ring is AMS 5643.

In a further aspect, the present invention provides a bearing comprising:
  a ring, and
  the bearing liner as described herein disposed on an inner and/or outer surface of the ring.

For example, the bearing liner may be attached to the bore of an inner ring.

Typically, the bearing liner is disposed on the inner surface of the ring, i.e. the "working surface" of the ring that, in use, is in sliding contact with a journal.

The bearing is preferably an aerospace bearing. Aerospace bearings operate under particularly arduous conditions, and may therefore fail relatively rapidly. As a result, aircraft maintenance guidelines enforce frequent inspection intervals. Advantageously, in view of the low wear rate of the bearing liner of the present invention during the end of life phase, the mean time between replacement (MTBR) of the aerospace bearing may be increased.

The bearing may be a self-lubricating bearing. The bearing may be a plain bearing. The bearing may be a self-lubricating, plain bearing.

In a further aspect, the present invention provides for the use of a bearing as described herein in an aircraft, for example a fixed wing aircraft or a rotary wing aircraft.

In a further aspect, the present invention provides a method of manufacturing a bearing liner, the method comprising:
  providing a first fabric impregnated with a binder,
  providing a second fabric comprising a bearing element contact surface comprising lubricating fibers, and structural fibers supporting the bearing element contact surface, wherein at least some of the structural fibers comprise a structural component and a lubricating component, and
  contacting and compressing together the first and second fabrics, whereby at least some of the binder in the first fabric transfers to the second fabric.

In the contacting and compressing step, the binder-impregnated first fabric is typically pressed against the structural layer of the second fabric, i.e. the surface opposite the bearing element contact surface.

The compressing is typically carried out at an elevated temperature, for example 160-180° C. The temperature used will depend on the nature of the binder material. As noted above, phenolic resins may suitably be used. The elevated temperature facilitates the amount of binder that is transferred to, and impregnates, the second fabric. The first and/or second fabric(s) is/are typically woven.

In a further aspect, the present invention provides the use of the bearing liner described herein for increasing the working lifetime of a bearing.

BRIEF DESCRIPTION OF THE DRAWINGS

The invention will now be described with reference to the following non-limiting drawings, in which.

DETAILED DESCRIPTION OF THE PRESENT INVENTION

Figure 1A:
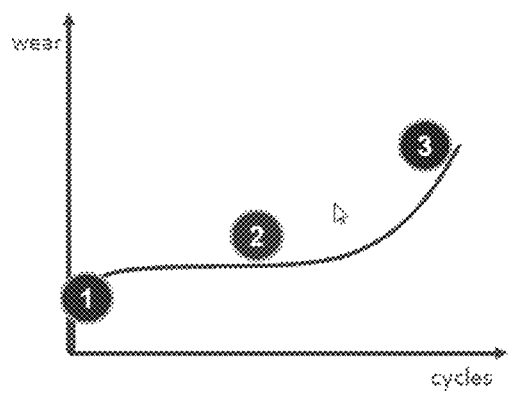
FIG. 1a shows a plot of wear rate versus cycles for a prior art bearing liner.
Figure 1B:
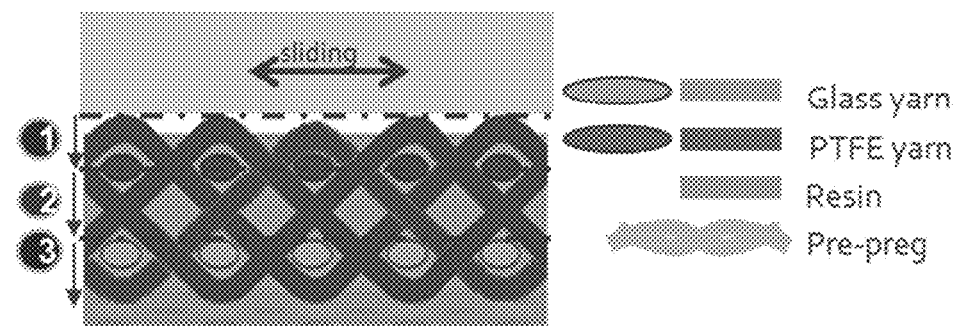
FIG. 1b shows a schematic of the structure of the same prior art bearing liner.

FIG. 1a shows a plot of wear versus cycles for a typical prior art self-lubricating bearing. FIG. 1b is a schematic of the structure of the bearing liner. The liner is made of a woven fabric impregnated with resin, the woven fabric containing PTFE lubricating yarns and glass structural yarns. The plot of FIG. 1a consists of three distinct wear rates, which can be attributed to three areas of the composite material. In the "bedding in" period (1), a relatively rapid wear rate occurs as the exposed fabric peaks are removed and the content of resin is low. This "bedding in" period (1) results in conformity between the inner and outer rings. In the "plateau" period (2), there is only minimal wear in view of the high content of PTFE and resin. Finally, in the "end of life" phase (3), the wear rate increase rapidly in view of the increased glass content. This rapid increase in wear between the so-called alarm point (the point at which the liner is worn down to the structural yarns and the wear increases to an unfavorable level) and the so-called critical point (the point at which the bearing liner fails) may result in only minimal warning of the failure of the bearing liner. This is particularly problematic in arduous applications such as rotary wing flight control, and as a result maintenance guidelines enforce frequent inspection intervals.

Figure 2:
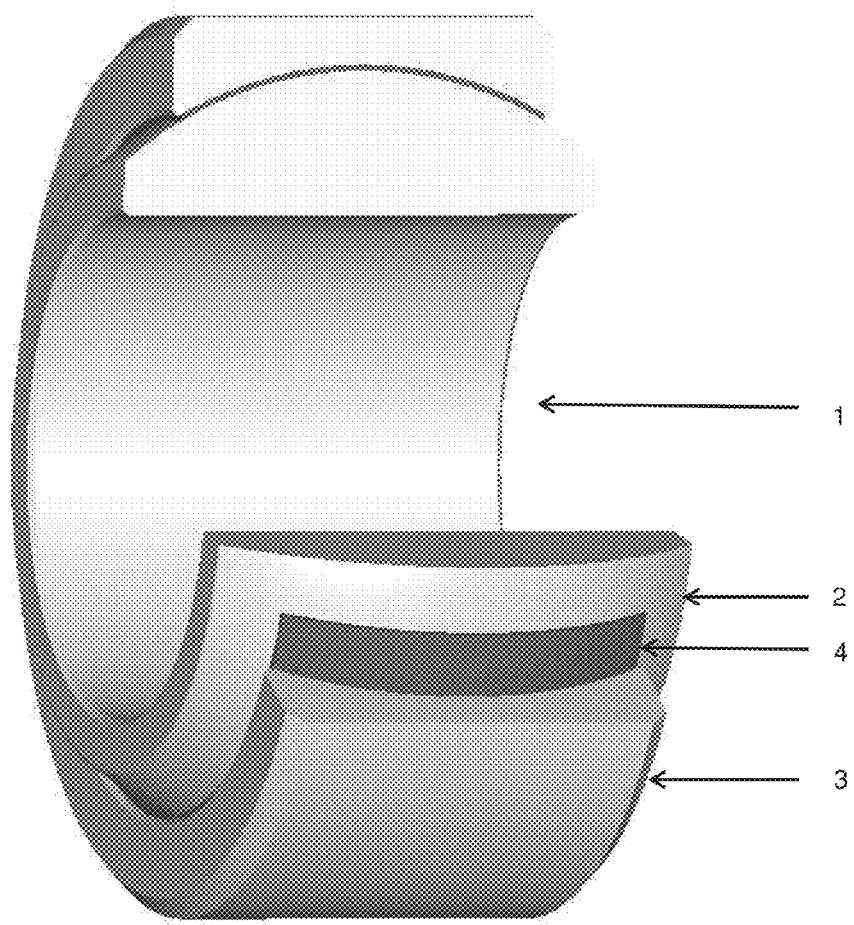
FIG. 2 shows a part-cutaway view of a bearing according to the present invention.

Referring to FIG. 2, the bearing (shown generally at 1) comprises an inner ring 2, an outer ring 3 and a bearing liner 4 disposed therebetween.

Figure 3:
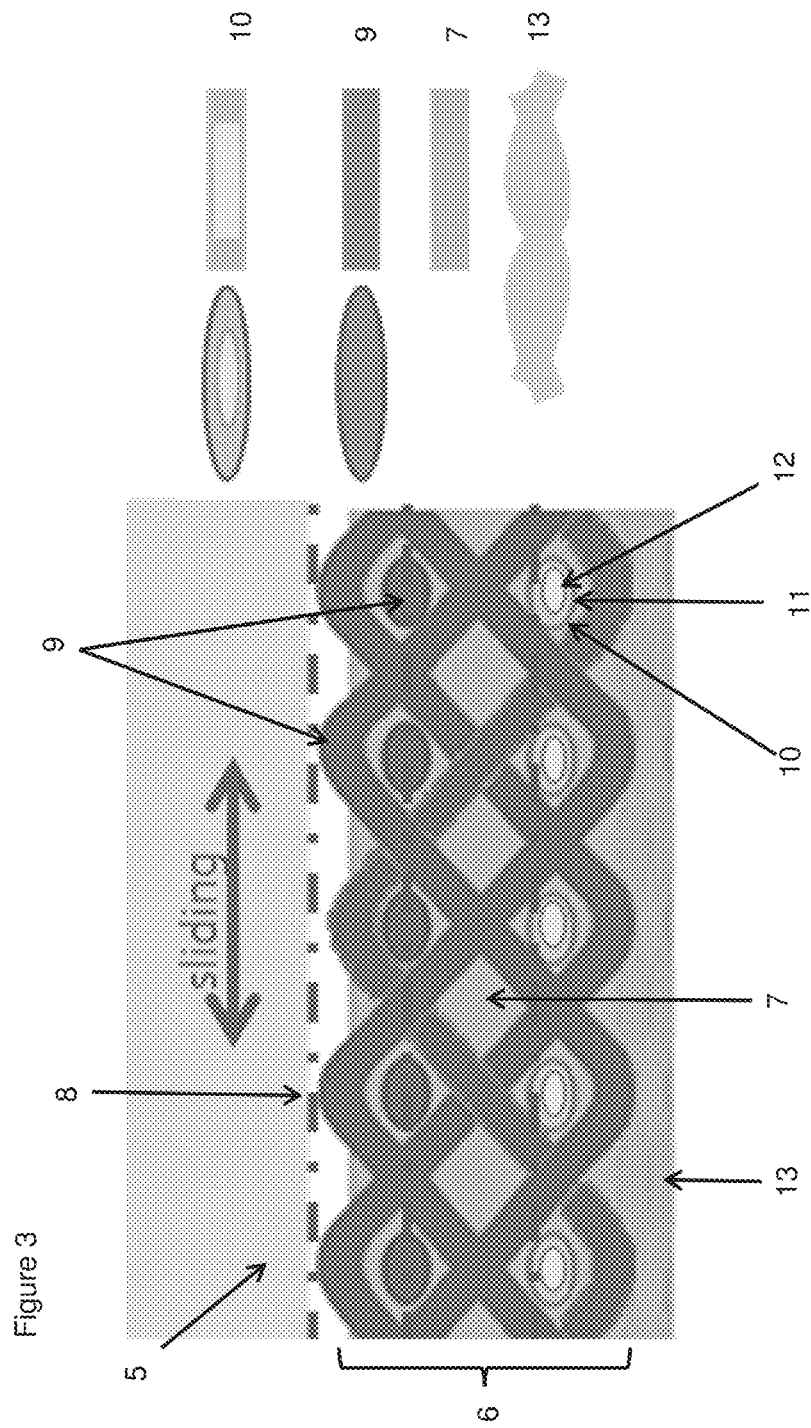
FIG. 3 shows a schematic of a bearing liner according to the present invention.

Referring to FIG. 3, the bearing liner (shown generally at 5) comprises a fabric 6 impregnated with a binder 7. The fabric comprises a bearing element contact surface 8 comprising lubricating fibers 9, and structural fibers 10 supporting the bearing element contact surface. The structural fibers comprise a structural component 11 and a lubricating component 12.

The invention will now be described in relation to the following non-limiting examples.

Example 1

A woven fabric was prepared having the characteristics set out in Table 1.

TABLE 1

| Characteristics of the woven fabric of Example 1. | | | |
|---|---|---|---|
| Structural Yarn | | Lubricating Yarn | |
| Material | Ø (mm) | Material | Ø (mm) |
| Sheathed yarn* | Approx. 0.26 | PTFE | Approx. 0.13 |

*The sheathed yarn comprises stretch broken aramid sheathed with PTFE.

The woven fabric was laminated with a fiber sheet pre-impregnated with a resin binder. The resulting laminate was compressed at an elevated temperature so that the binder bled though to impregnate the woven fabric.

Comparative Example 1

A woven fabric was prepared having the characteristics set out in Table 2.

TABLE 2

| Characteristics of the woven fabric of Comparative Example 1. | | | |
|---|---|---|---|
| Structural Weft | | Lubricating Weft | |
| Material | Ø (mm) | Material | Ø (mm) |
| Glass | Approx. 0.12 | PTFE | Approx. 0.13 |

The woven fabric was laminated with a fiber sheet pre-impregnated with a resin binder. The resulting laminate was compressed at an elevated temperature so that the binder bled though to impregnate the woven fabric.

Figure 4:
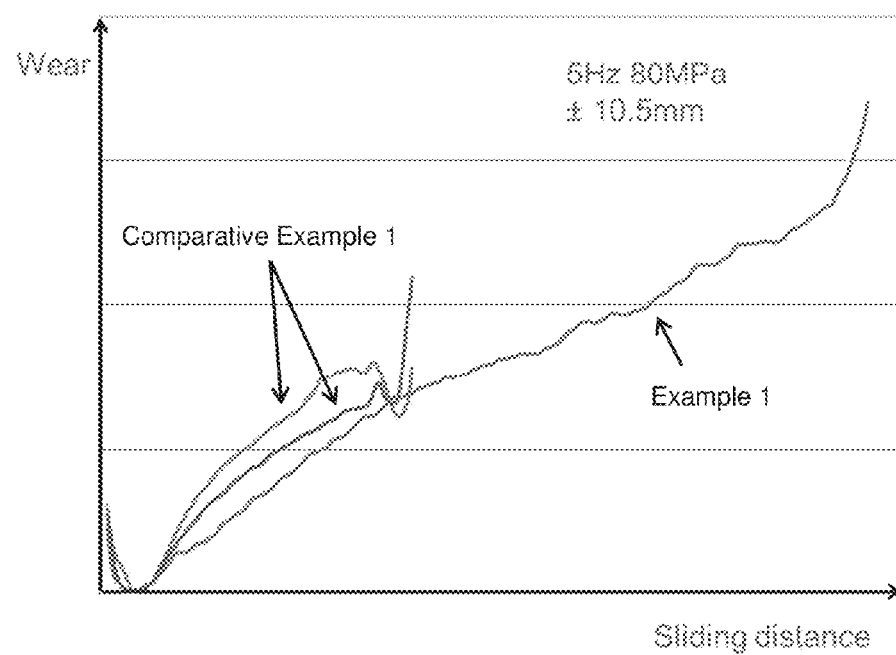
FIG. 4 shows a plot of wear versus sliding distance for a prior art bearing liner and a bearing liner according to the present invention.

The wear of the liners of Example 1 and Comparative Example 1 was measured for a number of cycles, and the results are shown in FIG. 4 (Comparative Example 1 measured twice). It can be seen that the liner of Example 1 exhibits a reduced wear rate during the end of life phase in comparison to the liner of Comparative Example 1.

The foregoing detailed description has been provided by way of explanation and illustration, and is not intended to limit the scope of the appended claims. Many variations in the presently preferred embodiments illustrated herein will be apparent to one of ordinary skill in the art, and remain within the scope of the appended claims and their equivalents.

The invention claimed is:

1. A bearing liner comprising a fabric impregnated with a binder, the fabric comprising:
   a bearing element contact surface including lubricating fibers, and
   structural fibers supporting the bearing element contact surface,
   wherein at least some of the structural fibers comprise a structural component and a lubricating component.

2. The bearing liner of claim 1, wherein the lubricating fibers comprise PTFE or graphite.

3. The bearing liner of claim 1, wherein the structural component of the structural fibers comprises at least one of
   glass,
   carbon fiber,
   aramid,
   polyether ether ketone,
   polyester,
   polyamide,
   polyphenylene sulphide, and
   aramid.

4. The bearing liner of claim 1, wherein the lubricating component of the structural fibers comprises one of PTFE or graphite.

5. The bearing liner of claim 1, wherein:
   the structural component comprises aramid, and
   the lubricating component comprises PTFE.

6. The bearing liner of claim 5, wherein the structural fibers comprise:
   from 10 to 30 wt. % aramid, and
   from 70 to 90 wt. % PTFE.

7. The bearing liner of claim 1, wherein the binder comprises a resin.

8. The bearing liner of claim 1, wherein the binder comprises a phenolic resin.

9. A bearing including the bearing liner of claim 1, wherein the bearing liner is integrated into the bearing, wherein the bearing liner is adapted to increase a working lifetime of the bearing.

10. A bearing including the bearing liner of claim 1, further comprising:
   an inner ring; and
   an outer ring;
   wherein the bearing liner is disposed between the inner ring and the outer ring.

11. The bearing of claim 10, wherein the bearing is a plain bearing.

12. The bearing of claim 10, wherein the bearing is a self-lubricating bearing.

13. The bearing of claim 10, wherein the bearing is an aerospace bearing.

14. A bearing including the bearing liner of claim 1, further comprising:
   a ring;
   wherein the bearing liner is disposed on an inner surface of the ring.

15. The bearing of claim 14, wherein the bearing is a plain bearing.

16. The bearing of claim 14, wherein the bearing is a self-lubricating bearing.

17. The bearing of claim 14, wherein the bearing is an aerospace bearing.

18. A method of manufacturing a bearing liner, the method comprising steps of:
   providing a first fabric impregnated with a binder,
   providing a second fabric comprising a bearing element contact surface comprising lubricating fibers, and structural fibers supporting the bearing element contact surface, wherein at least some of the structural fibers comprise a structural component and a lubricating component, and
   contacting and compressing together the first and second fabrics, whereby at least some of the binder in the first fabric transfers to the second fabric.

* * * * *